F. A. B. HOLMES.
AUTOMATIC AIR CHUCK.
APPLICATION FILED AUG. 4, 1920.

1,362,699.

Patented Dec. 21, 1920.

Witness:
Geo. E. Harrison

Inventor
Frank A. B. Holmes.
By Pond & Wilson,
Attys.

UNITED STATES PATENT OFFICE.

FRANK A. B. HOLMES, OF CHICAGO, ILLINOIS, ASSIGNOR TO B. L. GRAY, OF CHICAGO, ILLINOIS.

AUTOMATIC AIR-CHUCK.

1,362,699.　　　　Specification of Letters Patent.　　Patented Dec. 21, 1920.

Application filed August 4, 1920. Serial No. 401,120.

*To all whom it may concern:*

Be it known that I, FRANK A. B. HOLMES, a citizen of the United States, residing at Chicago, in the county of Cook and State of Illinois, have invented certain new and useful Improvements in Automatic Air-Chucks, of which the following is a specification.

This invention relates to air chucks of that type commonly employed on the delivery end of an air hose for supplying compressed air to pneumatic tires and other articles which are inflated with compressed air. Chucks of this type are commonly equipped with a self-closing valve which normally prevents escape of the compressed air when the device is idle, and which opens to permit the passage or flow of the compressed air when the chuck is pressed upon the nipple of the tire or other article to be inflated.

The principal objects of the present invention are, to provide an improved air chuck for tire filling and analogous purposes which shall be effectively sealed against the escape of compressed air, to provide an air chuck which will permit a free flow of the air when applied, to provide an improved air chuck which shall not require springs or rubber washers, and to provide an air chuck which shall be instantly self-closing when withdrawn from the nipple of the tire, and which shall require but a light manual pressure to open the valve and hold it open for the flow of air.

These and other advantages of the invention will be readily apparent to those skilled in the art from the following detailed description, taken in connection with the accompanying drawing, wherein I have illustrated a practical and approved embodiment of the invention and in which—

Figure 2:
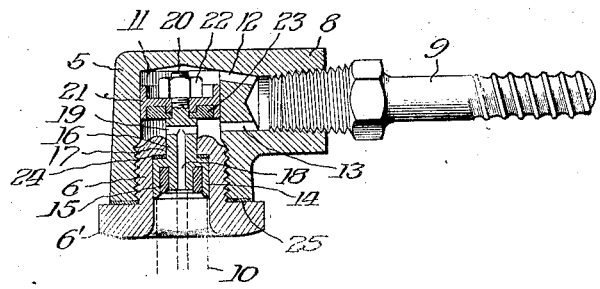
Fig. 2 is a similar view, showing the chuck applied to the nipple of a tire with the valve opened to permit the flow of compressed air to the nipple; and, Fig. 3 is a bottom plan view.
Figure 3:
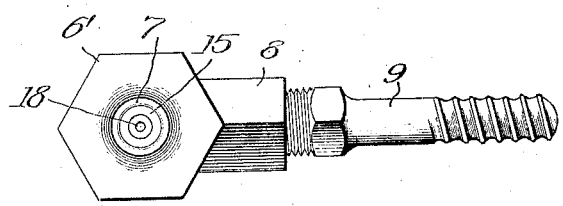

Referring to the drawing, the housing or casing of the chuck comprises, for purposes of assembling, a hollow head 5 interiorly threaded at its lower end and an exteriorly threaded mouth piece 6 formed with an annular flange 6' and a flaring mouth 7. The head 5 has a hollow laterally extending tapped neck 8 adapted to receive the usual coupling stem 9 to which the air hose (not shown) is applied. The flaring mouth 7 serves to guide the chuck onto the nipple 10 (Fig. 2) of a tire or other article to be inflated. In the upper portion of the head 5 is a cylindrical valve chamber 11 which communicates by upper and lower ports 12 and 13 with the interior of the hollow neck 8.

Slidably mounted within the hollow mouth piece 6 is a contact head 14 which is annularly grooved to receive a fiber contact packing ring 15 that engages with the nipple 10 when the chuck is applied to the latter to form an air tight seal. The contact head 14 is formed with a reduced stem 16 that has a sliding fit in a circular aperture 17 formed through the bottom wall of the hollow mouth piece 6, this same wall also forming the bottom wall of the valve chamber 11. The contact member is formed with a longitudinal duct 18 and a transverse duct 19 at the upper end of the duct 18. The stem 16 terminates above the transverse duct 19 in a reduced threaded portion 20 on which is mounted a differential piston valve 21 confined in place by a nut 22. On the lower side of the piston valve 21 is a gasket ring 23 which, in the closed position of the valve, seats upon the upper rounded end of the mouth piece 6. Surrounding the stem 16 of the contact member within the mouth piece 6 is an annular washer 24, and between the lower end of the head 5 and the flange 6' of the mouth piece is interposed a thin annular washer 25.

Figure 1:
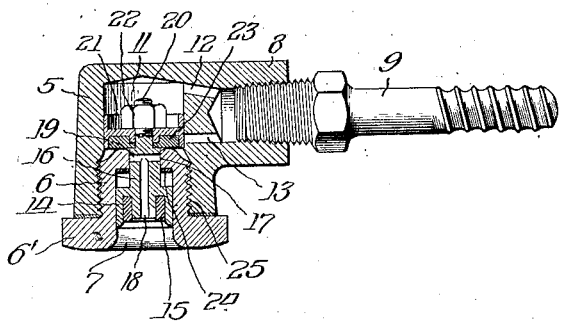
Figure 1 is a vertical axial section of my improved air chuck showing the valve in closed position to retain the air.

In the position of the parts represented in Fig. 1, the compressed air passing through the port 12 into the chamber 11 above the piston valve 21 forces the latter downwardly so that the port 13 is occluded by the piston valve and the duct 19 is likewise occluded by the wall of the opening 17. The washer 23 is also pressed hard down on the upper annular seat of the mouth piece 6. Hence, a triple seal is provided against escape of compressed air when the device is idle, this triple seal being constantly maintained by the air pressure on the upper side of the piston valve. When the device is applied by manual pressure to the nipple 10, the contact head and piston valve are forced upwardly to the position shown in Fig. 2, This opens the port 13 to the flow of air beneath the piston valve, opens the washer valve 23 to let the air flow between it and its seat, and likewise opens the transverse duct 19 to the air thus admitted beneath the piston valve, so that there is a free and unobstructed flow of air through the ducts 19 and 18 into the nipple 10. Since the effective area of the lower side of the piston valve is approximately two-thirds as great as the effective area of the upper side of the piston valve when the valve is fully opened, but a light manual pressure is required to hold the chuck on the nipple; and the instant the chuck is withdrawn, the superior pressure above the piston valve instantly forces the latter downwardly, thus simultaneously closing the ducts 13 and 19 and instantly sealing the device against the escape of air.

From the foregoing, it will be seen that my improved air chuck is of simple construction, is nowise dependent upon the action of springs for its operation, is partially balanced when opened, closes instantly when withdrawn from the nipple, and is effectively sealed against waste of air therethrough. It will be manifest that the device, as shown and described, may be modified in details without altering its substantial character or mode of action and without sacrificing any of the advantages inherent therein. Hence, I do not limit the invention to the structural details illustrated and described, but reserve all such variations and modifications as fall within the spirit and purview of the appended claims.

I claim—

1. An automatic air chuck of the character described, comprising, in combination, a housing having a hollow lateral neck for connection to an air hose, a valve chamber, and upper and lower ports connecting the interior of said neck with said valve chamber, a contact member slidably mounted in said housing and formed with an air duct, and a differential piston valve on the upper end of said contact member within said valve chamber, said piston valve controlling the lower of said ports.

2. An automatic air chuck of the character described, comprising, in combination, a housing having a hollow lateral neck for connection to an air hose, a valve chamber having an apertured bottom wall, and upper and lower ports connecting the interior of said neck with said valve chamber, a contact member slidably mounted in said housing and in the apertured bottom wall of said valve chamber, said contact member being formed with an air duct opening at its lower end through the face of said contact member and at its upper end normally closed by the wall of said aperture, and a differential piston valve on the upper end of said contact member within said valve chamber, said piston valve controlling the lower of said ports.

3. An automatic air chuck of the character described, comprising, in combination, a housing having a hollow lateral neck for connection to an air hose, a valve chamber having an apertured bottom wall, and upper and lower ports connecting the interior of said neck with said valve chamber, a contact member slidably mounted in said housing and in the apertured bottom wall of said valve chamber, said contact member having an axial duct opening at its lower end through the face of said contact member and a transverse duct communicating with the upper end of said axial duct and normally closed by the wall of said aperture, and a differential piston valve on the upper end of said contact member within said valve chamber, said piston valve serving to open and close the lower of said ports.

4. An automatic air chuck of the character described, comprising, in combination, a head having a hollow lateral neck, a valve chamber, and upper and lower ports connecting the interior of said neck with said valve chamber, a hollow mouth piece detachably mounted in the lower end of said head and formed with an apertured bottom wall, a contact member slidably mounted in said mouth piece, said contact member formed with a stem extending through said aperture and with an air duct, and a differential piston valve mounted on said stem within said valve chamber and controlling the lower of said ports.

5. An automatic air chuck of the character described, comprising, in combination, a head having a hollow lateral neck, a valve chamber, and upper and lower ports connecting the interior of said neck with said valve chamber, a hollow mouth piece screwjointed in the lower end of said head and formed with an apertured transverse wall constituting the bottom wall of said valve chamber, a contact member slidably mounted in said mouth piece and having a stem extending through said aperture, said contact member being formed with an air duct opening at its lower end through the face of said contact member and at its upper end normally closed by the wall of said aperture, and a differential piston valve on the stem of said contact member within said valve chamber, said piston valve controlling the lower of said ports.

6. An automatic air chuck of the character described, comprising, in combination, a head having a hollow lateral neck, a valve chamber, and upper and lower ports connecting the interior of said neck with said valve chamber, a hollow mouth piece screwjointed in the lower end of said head and formed with an apertured transverse wall constituting the bottom wall of said valve chamber and with a flange at its lower end forming a joint with the lower end of said head, a contact member slidably mounted in said mouth piece and having a stem extending through said aperture, said contact member being formed with an air duct opening at its lower end through the face of said contact member and at its upper end normally closed by the wall of said aperture, a differential piston valve on the stem of said contact member within said valve chamber, said piston valve controlling the lower of said ports, and a fibrous packing ring in the face of said contact member adapted to form an air-tight joint with the nipple of a tire or other article to be inflated.

FRANK A. B. HOLMES.